(12) United States Patent
Hwang et al.

(10) Patent No.: US 10,916,990 B2
(45) Date of Patent: Feb. 9, 2021

(54) MOTOR WITH BRACKET

(71) Applicant: LG ELECTRONICS INC., Seoul (KR)

(72) Inventors: Eunji Hwang, Seoul (KR); Sunggi Kim, Seoul (KR); Byungjik Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 545 days.

(21) Appl. No.: 15/698,925

(22) Filed: Sep. 8, 2017

(65) Prior Publication Data

US 2018/0076682 A1 Mar. 15, 2018

(30) Foreign Application Priority Data

Sep. 9, 2016 (KR) .................. 10-2016-0116746

(51) Int. Cl.
| | |
|---|---|
| *H02K 5/16* | (2006.01) |
| *H02K 5/20* | (2006.01) |
| *H02K 5/173* | (2006.01) |
| *H02K 9/06* | (2006.01) |

(52) U.S. Cl.
CPC ........... *H02K 5/161* (2013.01); *H02K 5/1732* (2013.01); *H02K 5/20* (2013.01); *H02K 9/06* (2013.01)

(58) Field of Classification Search
CPC ........ H02K 5/161; H02K 5/1732; H02K 5/20; H02K 9/06; H02K 2205/09; H02K 9/02; H02K 7/083; H02K 9/04; H02K 7/08; H02K 7/086; A47L 9/2857
USPC .......................................... 310/62, 60 R, 65
See application file for complete search history.

(56) References Cited

U.S. PATENT DOCUMENTS

| | | | |
|---|---|---|---|
| 4,514,458 A | 4/1985 | Thorn | |
| 2005/0123398 A1* | 6/2005 | Tam | A47L 5/22 415/211.2 |
| 2007/0096572 A1 | 5/2007 | Watkins | |
| 2009/0108715 A1 | 4/2009 | Sopp | |

(Continued)

FOREIGN PATENT DOCUMENTS

| | | |
|---|---|---|
| DE | 102005010459 A1 | 9/2006 |
| EP | 2899414 A1 | 7/2015 |

(Continued)

OTHER PUBLICATIONS

Received STIC search reports from EIC 2800 searcher Miner Christian on Jul. 10, 2019 for claim 19. (Year: 2019).*

(Continued)

*Primary Examiner* — Shawki S Ismail
*Assistant Examiner* — Htet Z Kyaw
(74) *Attorney, Agent, or Firm* — Fish & Richardson P.C.

(57) ABSTRACT

A motor includes a motor body, a bracket installed in the motor body, a rotating shaft, a bearing accommodated inside the bracket and supporting the rotating shaft, and a bearing supporter defining a plurality of pores. The bracket and the bearing define a bearing heat dissipation flow path between an outer surface of the bearing and an inner surface of the bracket, and the bearing heat dissipation flow path is configured to pass air therethrough. The bearing supporter is disposed in the bearing heat dissipation flow path, and the bracket defines a bracket through-hole configured to discharge air that has passed through the plurality of pores of the bearing supporter.

20 Claims, 10 Drawing Sheets

(56) References Cited

U.S. PATENT DOCUMENTS

2015/0198084 A1     7/2015   Daimer
2017/0012570 A1*   1/2017   Bauer .................... F16C 27/00

FOREIGN PATENT DOCUMENTS

| JP | H06311690 A | | 11/1994 | |
|----|----|----|----|----|
| JP | 2014220998 A1 | | 11/2014 | |
| KR | 10-1287468 | | 7/2013 | |
| KR | 1412591 A1 | | 6/2014 | |
| KR | 2016097885 A1 | | 8/2016 | |
| WO | WO-2006094894 A2 | * | 9/2006 | ............. H02K 5/148 |

OTHER PUBLICATIONS

Received STIC search reports from EIC 2800 searcher John Digeronimo on Jul. 9, 2019 for claim 5. (Year: 2019).*
Received STIC search reports from EIC 2800 searcher Steve Chung on Jul. 9, 2019 for claim 1. (Year: 2019).*
Extended European Search Report in European Application No. 17190140.8, dated Jan. 29, 2018, 8 pages.

* cited by examiner

MOTOR WITH BRACKET

CROSS-REFERENCE TO RELATED APPLICATIONS

The present application claims priority under 35 U.S.C. 0§ 119 and 365 to Korean Patent Application No. 10-2016-0116746 filed on Sep. 9, 2016, which is hereby incorporated by reference in its entirety.

FIELD

The present disclosure relates to a motor, and more particularly, to a motor including a bearing.

BACKGROUND

A motor may be installed in a household appliance such as a vacuum cleaner. For example, a motor in a vacuum cleaner may generate a driving force for suctioning dust into a dust collecting part.

An example motor may include a motor housing, a stator installed in the motor housing, a rotor rotated by the stator, and a rotating shaft having the rotor mounted thereon.

In some examples, the rotating shaft of the motor may be rotatably supported by at least one bearing. The rotating shaft may be rotated at high speed while being supported by the bearing.

In some cases, when the temperature in the motor increases, the performance of the motor may be deteriorated, and therefore, the temperature in the motor may be maintained such that the motor is not overheated.

Heat of the bearing is one of several factors that can increase the temperature in the motor, and therefore, the heat of the bearing may be dissipated such that the bearing is not overheated. For example, when the rotating shaft is rotated at high speed in the motor, the bearing may be overheated. In this case, the lifespan of the bearing may be shortened.

SUMMARY

A motor is provided to enable heat of a bearing to be efficiently dissipated by air flowing in the motor.

The motor may include a bearing supporter that can align the position of a bearing while assisting the heat dissipation of the bearing.

According to one aspect of subject matter described in this application, a motor includes a motor body, a bracket installed in the motor body, a rotating shaft, a bearing accommodated inside the bracket and supporting the rotating shaft, and a bearing supporter defining a plurality of pores. The bracket and the bearing define a bearing heat dissipation flow path between an outer surface of the bearing and an inner surface of the bracket, and the bearing heat dissipation flow path is configured to pass air therethrough. The bearing supporter is disposed in the bearing heat dissipation flow path, and the bracket defines a bracket through-hole configured to discharge air that has passed through the plurality of pores of the bearing supporter.

Implementations according to this aspect may include one or more of following features. The bearing supporter may include a metal wire mesh in which at least one metal wire has one or more curved portions. The bearing supporter may have a hollow cylindrical shape, and the bearing supporter may have an inner surface that contacts the outer surface of the bearing, and an outer surface that contacts the inner surface of the bracket. In some implementations, the bracket through-hole faces one or more of the plurality of pores.

According to another aspect of subject matter described in this application, a motor includes a motor housing, a rotating shaft assembly that includes a rotating shaft, a rotor, and a bearing in which the rotor and the bearing are mounted to the rotating shaft, a bearing supporter defining a plurality of pores, a stator installed in the motor housing, the stator surrounding the rotor, an impeller connected to the rotating shaft, an impeller cover that surrounds an outer circumference of the impeller and that defines an air inlet between the impeller and the impeller cover, a diffuser disposed inside the impeller cover, and a bracket coupled to at least one of the motor housing, the impeller cover, or the diffuser. The bearing and the bracket define a bearing heat dissipation flow path between an outer surface of the bearing and an inner surface of the bracket, and the bearing heat dissipation flow path is configured to pass air. The bearing supporter is disposed in the bearing heat dissipation flow path, the bracket defines a bracket through-hole facing one or more of the plurality of pores, and the bracket through-hole is configured to discharge air that has passed through the plurality of pores of the bearing supporter.

Implementations according to this aspect, the bearing supporter may have an end part facing toward the rotor. The diffuser may include a guide vane configured to guide air toward a gap between the bearing supporter and the rotor. The bearing may include an inner rim fixed to the rotating shaft, an outer rim spaced apart from the inner rim, and a rolling member disposed between the inner rim and the outer rim.

In some implementations, the bracket may include a bearing supporter housing part that surrounds an outer circumference of the bearing supporter, and a cover part that extends from the bearing supporter housing part and covers a portion of the bearing between the inner rim and the outer rim, the cover part being positioned opposite the impeller. The bracket through-hole may be defined in at least one of the bearing supporter housing part or the cover part.

In some implementations, the cover part may define the bracket through-hole at a position that faces the bearing supporter. In some examples, the cover part and the impeller may define a first gap configured to receive the air that has passed through the bracket through-hole. The diffuser and the impeller may define a second gap that is configured to discharge the air that has passed through the first gap.

In some implementations, the bracket through-hole may be located between the first gap and the bearing supporter, and face each of the first gap and the bearing supporter. The bearing may include an inner rim fixed to the rotating shaft, an outer rim spaced apart from the inner rim, and a rolling member disposed between the inner rim and the outer rim. The bracket may include a bearing supporter housing part that surrounds the bearing supporter, and the bearing supporter housing part may define the bracket through-hole. In some cases, the diffuser may define a diffuser through-hole that extends to a space between the diffuser and the impeller cover, and the diffuser through-hole is configured to communicate with the bracket through-hole.

In some implementations, the bearing supporter may include a metal wire mesh in which at least one metal wire has one or more of curved portions. The bearing supporter may have a hollow cylindrical shape, and the bearing supporter may have an inner surface that contacts the outer surface of the bearing, and an outer surface that contacts the inner surface of the bracket.

In some implementations, the bearing may include an inner rim fixed to the rotating shaft, an outer rim spaced apart from the inner rim, and a rolling member disposed between the inner rim and the outer rim. The bracket may include a bearing supporter housing part that surrounds the bearing supporter, and the bearing supporter may have an external diameter less than an internal diameter of the bearing supporter housing part. The bearing heat dissipation flow path may have a hollow cylindrical shape and be defined between an outer circumference of the outer rim and an inner circumference of the bearing supporter housing part.

In some implementations, the motor may further include a second bearing mounted to the rotating shaft and a second bearing supporter defining a plurality of pores. The motor housing may include a hollow part that has an inner diameter greater than an outer diameter of the rotating shaft. The second bearing may have an outer diameter less than the inner diameter of the hollow part and is located between the rotating shaft and the hollow part. The hollow part and the second bearing may define a second bearing heat dissipation flow path between an inner surface of the hollow part and an outer surface of the second bearing in which the second bearing supporter may be disposed in the second bearing heat dissipation flow path.

In some implementations, the motor housing may define at least one air outlet that faces the second bearing supporter. The second bearing supporter may have an end part facing toward the rotor.

According to another aspect, a motor includes a motor housing, a rotating shaft assembly including a rotating shaft, a rotor, and a bearing in which the rotor and the bearing are mounted to the rotating shaft, a stator installed in the motor housing, the stator surrounding the rotor, an impeller connected to the rotating shaft, an impeller cover surrounding an outer circumference of the impeller and defining an air inlet between the impeller and the impeller cover, a diffuser disposed inside the impeller cover, a bracket mounted to at least one of the impeller cover, the motor housing, or the diffuser, and a bearing supporter disposed between the bracket and the bearing in which the bearing supporter defines a plurality of pores. The bearing includes an inner rim fixed to the rotating shaft, an outer rim spaced apart from the inner rim, and a rolling member disposed between the inner rim and the outer rim. The bracket includes a bearing supporter housing part that surrounds the bearing supporter, and a cover part that extends from the bearing supporter housing part and covers a portion of the bearing between the inner rim and the outer rim.

The cover part defines at least one first bracket through-hole that faces at least a portion of the bearing supporter, and the bearing supporter housing part defines at least one second bracket through-hole.

The diffuser defines a diffuser through-hole that extends to a space between the diffuser and the impeller cover, the diffuser through-hole being configured to communicate with the second bracket through-hole, and the first and second bracket through-holes extend toward different directions from each other.

Implementations according to this aspect, the bearing supporter may have an inner surface that contacts an outer surface of the outer rim, and an outer surface that contacts an inner surface of the bearing supporter housing part.

According to the present disclosure, as air inside the motor passes through the plurality of pores formed in the bearing supporter, heat of each of the bearing, the bearing supporter, and the bracket can be dissipated. In some implementations, it may be possible to minimize that the inside of the motor is overheated and to maximize the lifespan of the bearing.

Further, it may be possible to efficiently dissipate heat of the bearing through a simple structure in which the bearing supporter is disposed between the bearing and the bracket, and the bracket through-hole is formed in the bracket.

Further, when the position of the bearing is out of the regular position due to an assembly tolerance of the motor, or the like, the bearing can be aligned to the regular position by the bearing supporter that is elastically deformed by the bearing. In some implementations, the performance of the bearing can be maximized.

Further, heat of the second bearing accommodated in the motor housing can be efficiently dissipated by air passing between the rotor and the stator.

Further, as the air inside the motor is rapidly flowed through the two heat dissipation flow paths, the heat dissipation performance of the bearing can be maximized.

The details of one or more implementations are set forth in the accompanying drawings and the description below. Other features will be apparent from the description and drawings, and from the claims.

DETAILED DESCRIPTION

Hereinafter, exemplary implementations of the present disclosure will be described in detail with reference to the accompanying drawings.

Figure 1:
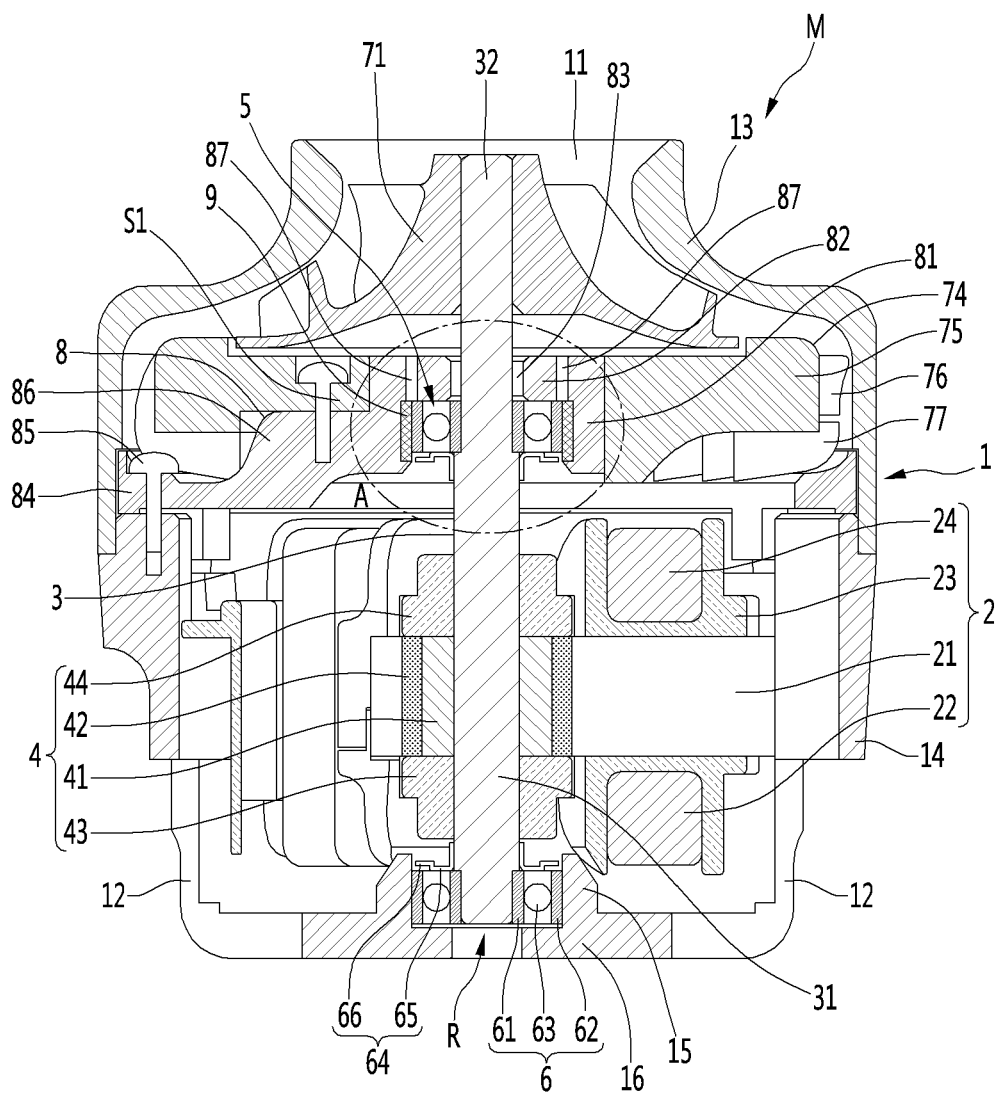
FIG. 1 is a sectional view showing an example motor.
Figure 2:
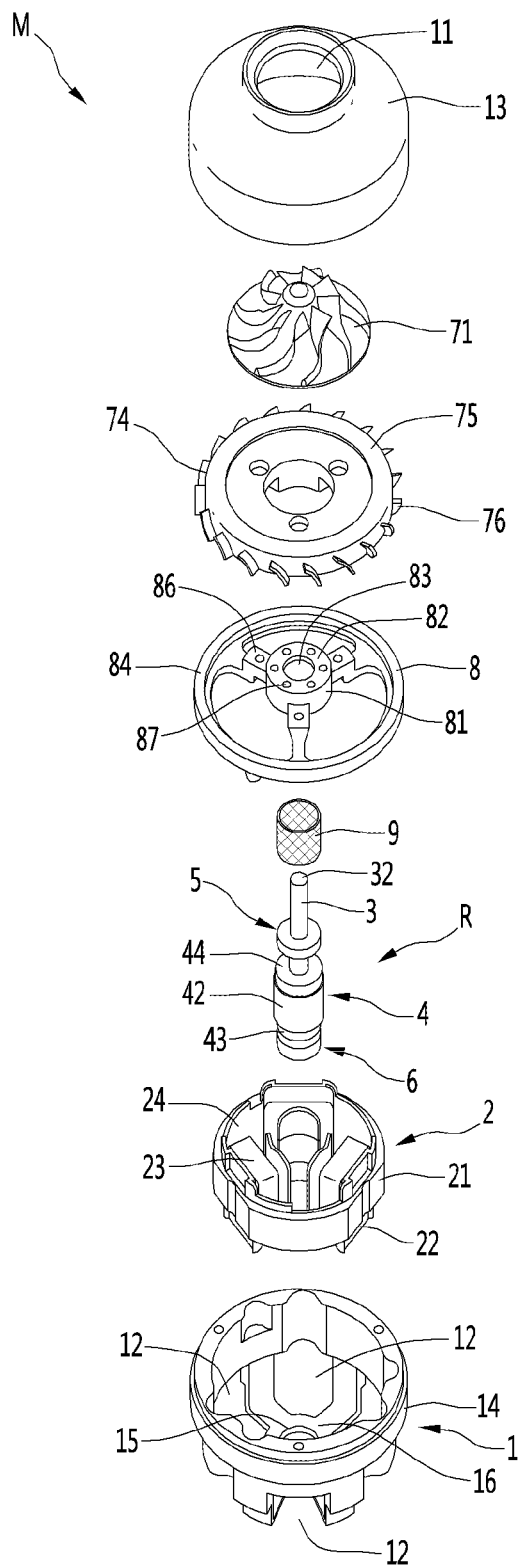
FIG. 2 is an exploded perspective view showing the example motor.
Figure 3:
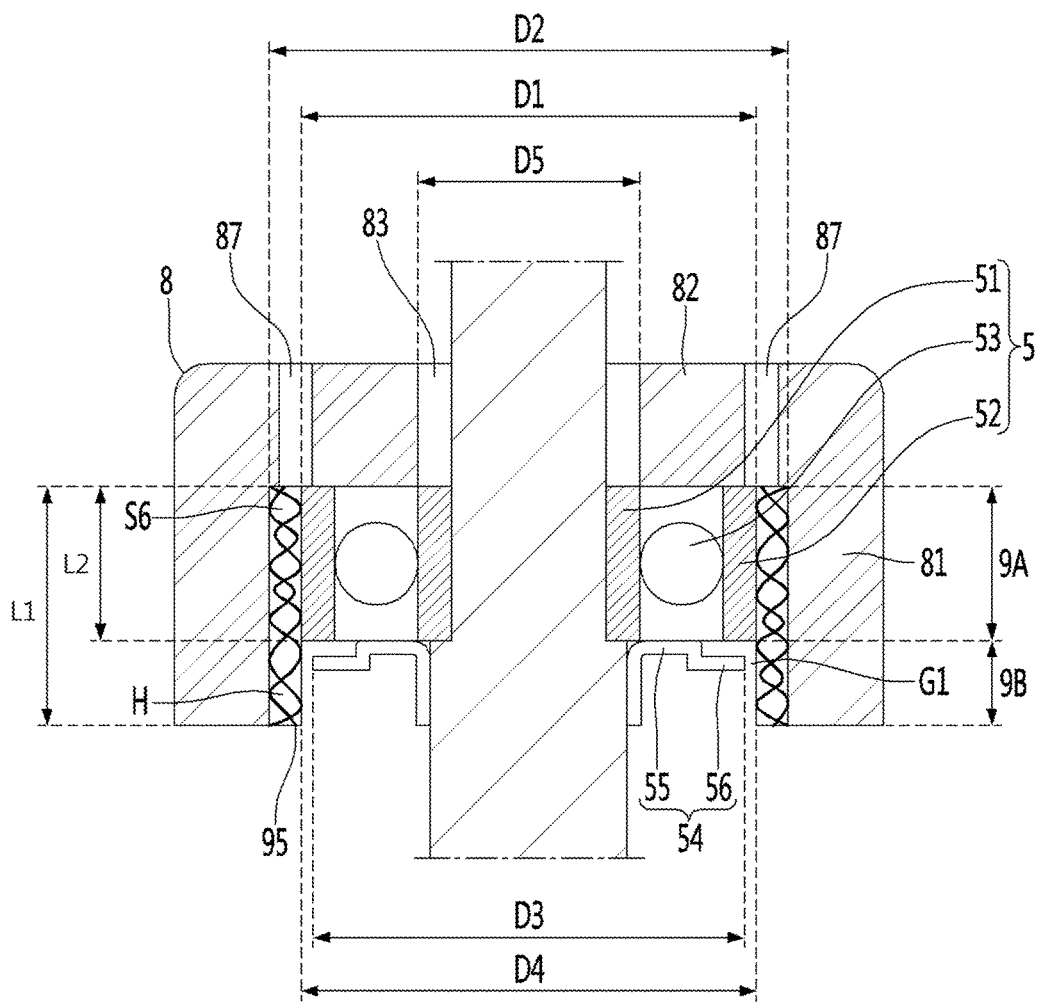
FIG. 3 is an enlarged sectional view of portion A of FIG. 1.
Figure 4:
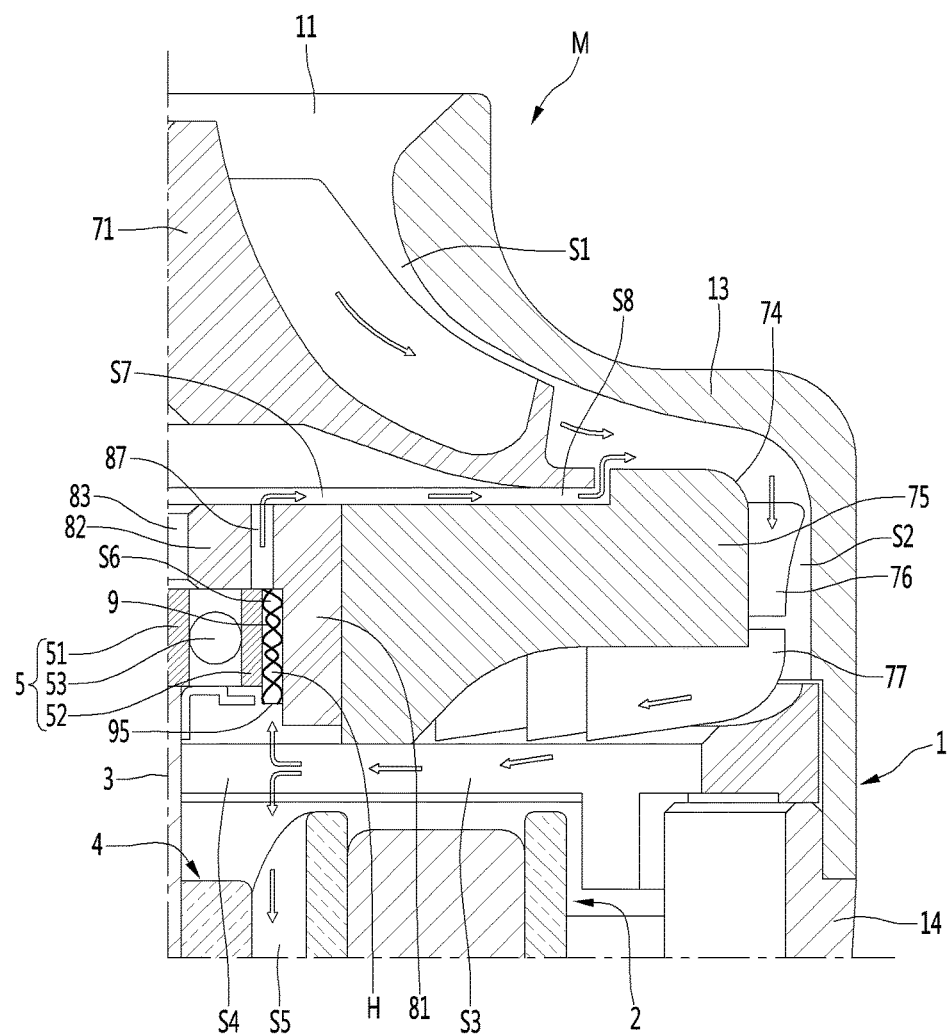
FIG. 4 is a view showing an example flow of air in the motor dissipating heat of an example bearing.
Figure 5:
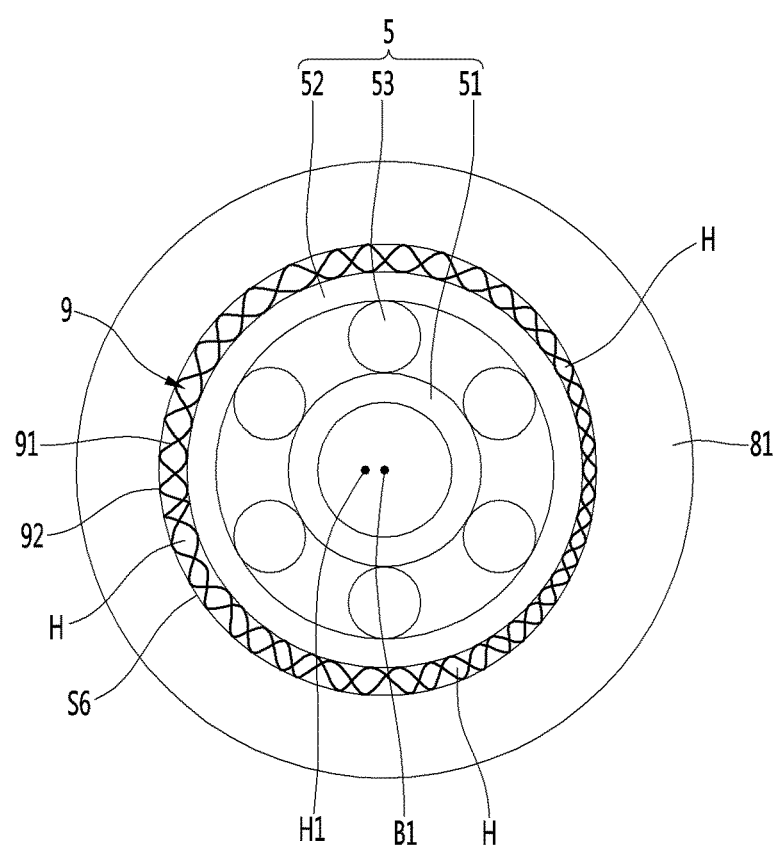
FIG. 5 is a cross-sectional view showing an example bearing supporter that is elastically deformed by the bearing.

FIG. 1 is a sectional view showing an example motor. FIG. 2 is an exploded perspective view showing the example motor. FIG. 3 is an enlarged sectional view of portion A of FIG. 1. FIG. 4 is a view showing an example flow of air when the motor dissipates heat of an example bearing in the motor. FIG. 5 is a cross-sectional view when an example bearing supporter is elastically deformed by the bearing.

The motor M of this implementation may include a motor body 1, a rotating shaft 3, a bearing 5, a bracket 8, and a bearing supporter 9.

The motor M may be configured such that air in the motor M passes between the bearing 5 and the bracket 8 and is then discharged to the outside of the bracket 8.

In the motor M, an example bearing heat dissipation flow path S6 through which air passes may be formed between the outer surface of the bearing 5 and the inner surface of the bracket 8. In some implementations, the bearing supporter 9 having a plurality of pores H formed therein may be disposed in the bearing heat dissipation flow path S6. In some implementations, a bracket through-hole 87 through which air passing through the plurality of pores H is discharged to the outside of the bracket 8 may be formed in the bracket 8.

Heat of the bearing 5 may be transferred to the bracket 8 through the bearing supporter 9. Air in the motor M may be introduced into the bearing heat dissipation flow path S6 through the plurality of pores H formed in the bearing supporter 9, and may dissipate heat of the bearing 5, the bearing supporter 9, and the bracket 8 while passing through the bearing heat dissipation flow path S6. The air of the bearing heat dissipation flow path S6 may get out of the bracket 8 by passing through the bracket through-hole 87.

The motor body 1 may form an external appearance of the motor M. An air inlet 11 through which external air is suctioned into the motor body 1 may be formed in the motor body 1.

A space in which a stator 2, a rotor 4, the rotating shaft 3, the bearing 5, the bracket 8, and an impeller 71 are accommodated may be formed inside the motor body 1. An air outlet 12 through which the air in the motor M is discharged to the outside of the motor body 1 may be formed in the motor body 1.

In some implementations, the motor body 1 may be configured as an assembly of a plurality of members. The motor body 1 may include an impeller cover 13 in which the air inlet 11 is formed. The motor body may further include a motor housing 14 in which the air outlet 12 is formed. The impeller cover 13 may be coupled to the motor housing 14, and the motor housing 14 may constitute the motor body 1 together with impeller cover 13.

In some implementations, the motor body 1 may further include a separate frame disposed between the impeller cover 13 and the motor housing 14, and each of the impeller cover 13 and the motor housing 14 may be coupled to the frame.

In the motor M, a portion of the bracket 8 may be disposed between the impeller cover 13 and the motor housing 14, and each of the impeller cover 13 and the motor housing 14 may be coupled to the bracket 8. In this case, the bracket 8 may constitute a portion of the motor body 1.

The impeller cover 13 may surround the outer circumference of the impeller 71. The impeller cover 13 can protect the impeller 71 by surrounding the outer circumference of the impeller 71.

The impeller cover 13 may have an open surface toward the motor housing 14. The impeller cover 13 may be disposed to cover the open surface of the motor housing 14. The impeller cover 13 may be coupled to the motor housing 14 or the bracket 8 using a fastening member such as a screw, for example, or may be screw-coupled to the motor housing 14 or the bracket 8.

The air inlet 11 may be formed smaller than the surface opposite to the motor housing 14 in the impeller cover 13.

The inner circumferential surface of the impeller cover 13 may be spaced apart from the impeller 71, and air flowed by the impeller 71 may flow between the inner circumferential surface of the impeller cover 13 and the impeller 71.

The motor housing 14 may have a hollow cylindrical shape having an open surface. The air outlet 12 through which air in the motor housing 14 is discharged to the outside may be formed in the motor housing 14. The air outlet 12 may be formed in plural numbers in the motor housing 14.

In some implementations, the motor M may further include the stator 2 mounted in the motor body 1 and the rotor 4 mounted to the rotating shaft 3.

The stator 2 may be mounted in the motor body 1. The stator 2 may be mounted to the motor housing 14 to surround the outer circumference of the rotor 4. The stator 2 may be mounted to the motor housing 14 using a fastening member such as a screw. The stator 2 may be formed in a hollow cylindrical shape. The stator 2 may be mounted to surround the outer circumference of the rotor 4.

The stator 2 may be configured as an assembly of a plurality of members. The stator 2 may include a stator core 21, a pair of insulator 22 and 23 coupled to the stator core 21, and a coil 24 disposed at the insulators 22 and 23.

The rotor 4 and the bearing 5 may be mounted to the rotating shaft 3, and the rotating shaft 3 may constitute a rotating shaft assembly R together with the rotor 4 and the bearing 5.

The rotating shaft 3 may be disposed long from the inside of the motor housing 14 to the inside of the impeller cover 13. A portion of the rotating shaft 3 may be located inside the motor housing 14, and another portion of the rotating shaft 3 may be located inside the impeller cover 13.

The rotating shaft 3 is rotated together with the rotor 4, and may be supported by the bearing 5. The rotating shaft 3 may be rotatably located inside the motor body 1. The rotating shaft 3 may be rotated by the rotor 4 in the state in which the rotating shaft 3 is supported by the bearing 5.

The impeller 71 may be connected to the rotating shaft 3. When the rotating shaft 3 rotates, the impeller 71 may be rotated inside the impeller cover 13.

An impeller connection part 32 to which the impeller 71 is connected may be formed at the rotating shaft 3. The impeller connection part 32 may be formed at a position spaced apart from a part 31 surrounded by the rotor 4. The impeller connection part 32 may be formed at an end portion of the rotating shaft 3.

In some implementations, a second bearing mounting part at which a second bearing 6 which will be described later is mounted may be formed at the rotating shaft 3.

The rotor 4 may be mounted to surround a portion of the rotating shaft 3. The rotor 4 may be rotatably located inside the stator 2. The rotor 4 may be formed in a hollow cylindrical shape.

The rotor 4 may include an iron core 41 fixed to the rotating shaft 3, a magnet 42 installed at the iron core 41, and a pair of end plates 43 and 44 that fix the magnet 42.

The rotor 4 may be mounted to surround the part 31 between one end and the other end of the rotating shaft 3. The rotor 4 may be mounted between the impeller connection part 32 and the second bearing mounting part.

The bearing 5 may be accommodated inside the bracket 8, and may support the rotating shaft 3. The bearing 5 may be accommodated inside the bracket 8 together with the bearing supporter 9.

The bearing 5 may include an inner rim 51 fixed to the rotating shaft 3, an outer rim 52 spaced apart from the inner rim 51, and a rolling member 53 disposed between the inner rim 51 and the outer rim 52.

The bearing 5 may be one of a roller bearing and a ball bearing. The bearing 5 may be configured as a ball bearing in which the rolling member 53 is configured as a ball to have high performance in high-speed rotation.

The external diameter D1 of the outer rim 52 of the bearing 5 may be smaller than the internal diameter D2 of a bearing supporter housing part 81 which will be described later. In some implementations, the bearing heat dissipation flow path S6 may be formed between the outer circumferential surface of the outer rim 52 of the bearing 5 and the inner circumferential surface of the bearing supporter housing part 81. The bearing heat dissipation flow path S6 may be formed in a hollow cylindrical shape between the outer rim 52 of the bearing 5 and the bearing supporter housing part 81.

In some implementations, the motor M may further include an O-ring 54 fixed to the rotating shaft 3, the O-ring 54 restricting the bearing 5.

The O-ring 54 may be fixed to the rotating shaft 3, and may constitute a rotating shaft assembly (or rotor assembly) together with the rotating shaft 3 and the rotor 4.

The O-ring 54 may be located between the bearing 5 and the rotor 4 in the length direction of the rotating shaft 3. In some examples, the O-ring 54 may be a bearing stopper that restricts the bearing 5 from moving toward the rotor 4.

The O-ring 54 may be fixed to the rotating shaft 3 to come in contact with a portion of the bearing 5. At least one portion of the O-ring 54 may face the inner rim 51 of the bearing 5. The O-ring 54 may come in contact with the inner rim 51 of the bearing 5. The O-ring 54 may be a bearing stopper that restricts the inner rim 51 of the bearing 5 from sliding toward the rotor 4.

The external diameter D3 of the O-ring 54 may be smaller than the internal diameter D4 of the bearing supporter 9.

The O-ring 54 may be located inside the bearing supporter 9. When the rotating shaft 3 rotates, the O-ring 54 may be rotated in an empty space formed inside the bearing supporter 9.

A gap G1 may be formed between the outer circumference of the O-ring 54 and the bearing supporter 9, and the O-ring 54 and the bearing supporter 9 may not come in contact with each other. When the O-ring 54 and the bearing supporter 9 come in contact with each other, at least one of the O-ring 54 and the bearing supporter 9 may be abraded. In some implementations, when the O-ring 54 and the bearing supporter 9 do not come in contact with each other, the lifespan of each of the O-ring 54 and the bearing supporter 9 can be maximized.

The O-ring 54 may be mounted to the rotating shaft 3, come in contact with the inner rim 51 of the bearing 5, and be spaced apart from the bearing supporter 9.

In some implementations, the O-ring 54 may include an inner ring 55 coming in contact with the inner rim 51 of the bearing 5 and an outer ring 56 spaced apart from the outer rim 52 of the bearing 5. The outer circumference of the outer ring 56 may be the outer circumference of the O-ring 54, and the external diameter of the outer ring 56 may be the external diameter D3 of the O-ring 54.

In the motor M, a portion of the rotating shaft 3, which is located inside the motor housing 14, may be directly supported by the motor housing 14.

When the rotating shaft 3 is directly supported by the motor housing 14, a rotating shaft support part rotatably supporting the rotating shaft 3 may be formed in the motor housing 14. The rotating shaft support part may be formed in the motor housing 14 to surround the outer circumference of the rotating shaft 3. A lubrication medium for preventing abrasion between the rotating shaft 3 and the rotating shaft support part, such as a lubricant, may be provided to at least one of the rotating shaft 3 and the rotating shaft support part.

In the motor M, the portion of the rotating shaft 3, which is located inside the motor housing 14, may be supported through the second bearing 6. The motor M may further include the second bearing 6 installed at the rotating shaft 3, and the second bearing 6 may rotatably support the rotating shaft 3.

The second bearing 6 may be installed at the rotating shaft 3 to be spaced apart from the bearing 5.

The bearing 5 and the second bearing 6 may rotatably support the rotating shaft 3 at positions spaced apart from each other. In this case, the weight of the rotating shaft 3 may be distributed by the bearing 5 and the second bearing 6.

In the motor M, the bearing 5 and the second bearing 6 may be mounted together between the rotor 4 and the impeller 71. In this case, the bearing 5 and the second bearing 6 may be mounted to be spaced apart from each other in the axial direction of the rotating shaft 3 between the rotor 4 and the impeller 71.

In some implementations, in the motor M, the bearing 5 and the second bearing 6 may be mounted to be spaced apart from each other with the rotor 4 interposed therebetween. In this case, the bearing 5 and the second bearing 6 may support the rotating shaft 3 by efficiently distributing the weight of the rotating shaft 3. When the bearing 5 and the second bearing 6 are arranged with the rotor 4 interposed therebetween, the maximum weight applied to the bearing 5 and the second bearing 6 is lower than that when the bearing 5 and the second bearing 6 are mounted together between the rotor 4 and the impeller 71, and the lifespan of each of the bearing 5 and the second bearing 6 is longer than that when the bearing 5 and the second bearing 6 are mounted together between the rotor 4 and the impeller 71. In some implementations, when the bearing 5 and the second bearing 6 are arranged with the rotor 4 interposed therebetween, a separate space for allowing the bearing 5 and the second bearing 6 to be spaced apart from each other may not be required, and the motor M can be compact as compared with when the bearing 5 and the second bearing 6 are mounted together between the rotor 4 and the impeller 71.

The second bearing 6 may be located between the rotating shaft 3 and the motor housing 14 to support the rotating shaft 3. In this case, the second bearing 6 may be spaced apart from the bearing 5 with the rotor 4 interposed therebetween.

When the motor M includes both of the bearing 5 and the second bearing 6, the bearing 5 may be a load-side bearing close to the impeller 71, and the second bearing 6 may be a non-load-side bearing distant from the impeller 71, or vice versa.

In some implementations, when the motor M includes both of the bearing 5 and the second bearing 6, the bearing 5 may be a bracket-side bearing surrounded by the bracket 8, and the second bearing 6 may be a motor housing-side bearing surrounded by motor housing 14.

The bearing 5 may be a first bearing mounted between the impeller 71 and the second bearing 6, for example, or between the impeller 71 and the rotor 4, and the second bearing 6 may be an end bearing mounted at an end portion of the rotating shaft 3, which is opposite to the impeller 71.

When the rotating shaft 3 is supported by the second bearing 6, the second bearing 6 may be mounted to the rotating shaft 3 to be located inside the motor housing 14. A hollow part 15 larger than the rotating shaft 3 may be formed in the motor housing 14. For example, the hollow part 15 has an internal diameter greater than a diameter of the rotating shaft 3. The motor housing 14 may include a body part 16 from which the hollow part 15 protrudes.

In some examples, the hollow part 15 may be formed larger than the second bearing 6. The second bearing 6 may be directly supported by the motor housing 14, or may be supported by the motor housing 14 with a separate elastic member interposed therebetween.

When the second bearing 6 is directly supported by the motor housing 14, the outer circumference of the second bearing 6 may come in contact with the hollow part 15 to be supported by the hollow part 15.

The second bearing 6 may include an inner rim 61 fixed to the rotating shaft 3, an outer rim 62 spaced apart from the inner rim 61, and a rolling member 63 disposed between the inner rim 61 and the outer rim 62.

In some implementations, the second bearing 6 may be one of a roller bearing or a ball bearing. The second bearing 6 may be configured as a ball bearing in which the rolling member 63 is configured as a ball to have high performance in high-speed rotation.

The inner rim 61 of the second bearing 6 may be fixed to the rotating shaft 3, and the outer rim 62 of the second bearing 6 may come in contact with the hollow part 15 to be fixed to the hollow part 15.

In some implementations, the motor M may further include a second O-ring 64 fixed to the rotating shaft 3, the second O-ring 64 supporting the second bearing 6. The second O-ring 64 may be fixed to the rotating shaft 3, and may constitute a rotating shaft assembly (or rotor assembly) together with the rotating shaft 3 and the rotor 4.

The second O-ring 64 may be located between the second bearing 6 and the rotor 4 in the length direction of the rotating shaft 3. The second O-ring 64 may be a second bearing stopper that restricts the second bearing 6 from moving toward the rotor 4.

The second O-ring 64 may be fixed to the rotating shaft 3 to come in contact with a portion of the second bearing 6. At least one portion of the second O-ring 64 may face the inner rim 61 of the second bearing 6. The second O-ring 64 may come in contact with the inner rim 61 of the second bearing 6. The second O-ring 64 may be a bearing stopper that restricts the inner rim 61 of the second bearing 6 from sliding toward the rotor 4.

The second O-ring 64 may be mounted to the rotating shaft 3, come in contact with the inner rim 61 of the second bearing 6, and be spaced apart from the hollow part 15.

The second O-ring 64 may include an inner ring 65 coming in contact with the inner rim 61 of the second bearing 6 and an outer ring 66 spaced apart from the outer rim 62 of the second bearing 6.

In some implementations, the impeller 71 may be connected to the rotating shaft 3. The impeller 71 may be rotated together with the rotating shaft 3 in the state in which the impeller 71 is connected to the rotating shaft 3. The impeller 71 may be located between the impeller cover 13 and a diffuser 74 which will be described later. A gap S1 through which air flowed by the impeller 71 passes may be formed between the impeller 71 and the impeller cover 13.

In some implementations, the motor M may further include the diffuser 74 that guides the air flowed by the impeller 71. The air flowed by the impeller 71 may be guided by the diffuser 74, and the air guided by the diffuser 74 dissipates heat of the bearing 5 while passing between the bearing 5 and the bracket 8. The air flowed by the impeller 71 may be flowed into the bearing supporter 9 by the diffuser 74. The air flowed into the bearing supporter 9 may be introduced into the pores H of the bearing supporter 9 to pass through the bearing heat dissipation flow path S6, and then discharged from the bearing heat dissipation flow path S6 to the outside of the bracket 8 through the bracket through-hole 87.

The diffuser 74 may be disposed inside the impeller cover 13. The diffuser 74 may be mounted to at least one of the impeller cover 13 and the bracket 8. A gap S2 through which air guided by the diffuser 74 passes may be formed between the diffuser 74 and the impeller cover 13.

The diffuser 74 may include a body part 75 having a smaller size than the impeller cover 13, a diffuser vane 76 protruding from the outer circumference of the body part 75, and a guide vane 77 guiding air flowed by the diffuser vane 76.

The diffuser vane 76 may be formed to change the dynamic pressure of air passing through the impeller 71 to static pressure.

The guide vane 77 may guide air of which pressure is increased by the diffuser vane 76 toward at least one of the bearing supporter 9 and the rotor 4. The guide vane 77 may guide air toward a gap S4 between the bearing supporter 9 and the rotor 4.

The air guided by the guide vane 77 may pass through a gap S3 between the diffuser 74 and the stator 2 and then pass through the gap S4 between the bearing supporter 9 and the rotor 4.

Some of the air flowed by the guide vane 77 may be flowed into the bearing supporter 9 to dissipate heat of the bearing 5, the bearing supporter 9, and the bracket 8. Some of the air flowed by the guide vane 77, for example, air that is not introduced into the bearing supporter 9 may be flowed into a gap S5 between the rotor 4 and the stator 2 to dissipate heat of the rotor 4 and the stator 2.

The bracket 8 may be installed in the motor body 1. The bracket 8 may be installed in the motor body 1 to be located inside the motor body 1. The bracket 8 may be coupled to at least one of the motor housing 14, the impeller cover 13, and the diffuser 74.

The bracket 8 may simultaneously accommodate the bearing 5 and the bearing supporter 9 therein.

The bracket 8 may include the bearing supporter housing part 81 surrounding the outer circumference of the bearing supporter 9. The bracket 8 may include a cover part 82 formed at the bearing supporter housing part 81. The bracket 8 may include a fastening part 84 fastened to at least one of the motor housing 14 and the impeller cover 13. The bracket 8 may include at least one connection part 86 that connects the fastening part 84 and the bearing supporter housing part 81.

The internal diameter D2 of the bearing supporter housing part 81 may be greater than the external diameter D1 of the outer rim 52 of the bearing 5. The bearing supporter housing part 81 may be formed larger than the O-ring 54, and the internal diameter of the bearing supporter housing part 81 of the bracket 8 may be greater than the external diameter of the O-ring 54. The O-ring 54 may be rotated in a space formed inside the bearing supporter housing part 81. A gap may be formed between the inner circumferential surface of the bearing supporter housing part 81 of the bracket 8 and the outer circumference of the O-ring 54. The gap may be greater than the thickness of the bearing supporter 9.

The cover part 82 may cover between the inner rim 51 and the outer rim 52 of the bearing 5 and face the impeller 71.

The cover part 82 may be formed in a shape bent from the bearing supporter housing part 81. The cover part 82 may be formed in a ring shape at one end of the bearing supporter housing part 81.

A rotating shaft through-hole 83 through which the rotating shaft 3 rotatably passes may be formed in the cover part

82. The diameter D5 of the rotating shaft through-hole 83 may be smaller than the internal diameter D2 of the bearing supporter housing part 81.

The cover part 82 may be spaced apart from the O-ring 54, and a bearing accommodation space in which the bearing 5 is accommodated may be formed between a surface of the O-ring 54 facing the bearing 5 and a surface of the cover part 82 facing the bearing 5.

The fastening part 84 may be formed in a ring shape. The fastening part 84 may be fastened to at least one of the motor housing 14 and the impeller cover 13 using a fastening member 85 such as screw. The fastening part 84 may be formed larger than the bearing supporter housing part 81.

In some implementations, a first gap S7 through which air having passed through the bracket through-hole 87 passes may be formed between the cover part 82 and the impeller 71. In some implementations, a second gap S8 through which the air having passed through the first gap S7 is discharged toward a space between the diffuser 74 and the impeller cover 13 may be formed between the diffuser 74 and the impeller 71.

The bracket through-hole 87 may be formed in at least one of the bearing supporter housing part 81 and the cover part 82. Also, the bracket through-hole 87 may be formed to face at least some of the plurality of pores H.

At least one bracket through-hole 87 may be formed in an area of the cover part 82, which faces the bearing supporter 9. The bracket through-hole 87 may be formed to face each of the first gap S7 and the bearing supporter 9.

The bearing supporter 9 may have a hollow cylindrical shape. The inner surface of the bearing supporter 9 may come in contact with the outer surface of the bearing 5, and the outer surface of the bearing supporter 9 may come in contact with the inner surface of the bracket 8.

A cylindrical empty space may be formed inside the bearing supporter 9. The bearing supporter 9 may be disposed between the outer rim 52 of the bearing 5 and the bearing supporter housing part 81 of the bracket 8. The bearing supporter 9 may be disposed to come in contact with at least one of the outer rim 52 of the bearing 5 and the bearing supporter housing part 81 of the bracket 8. The inner surface of the bearing supporter 9 may come in contact with the outer surface of the outer rim 52 of the bearing 5, and the outer surface of the bearing supporter 9 may come in contact with the inner surface of the bearing supporter housing part 81 of the bracket 8.

The bearing supporter 9 may be formed to allow air to pass therethrough and to be elastically deformed by the bearing 5. The bearing supporter 9 may be elastically deformed by the plurality of pores H. In this case, the bearing supporter 9 may adjust the position of the bearing 5 to a regular position in the state in which the bearing supporter 9 is elastically deformed by the bearing 5.

The bearing 5 and the second bearing 6 may be mounted such that their center axes correspond to each other. When an error in concentricity between the bearing 5 and the second bearing 6 is large, the abrasion of any one of the bearing 5 and the second bearing 6 may be large.

In the motor M, the center axis H1 of the bearing supporter housing part 81 and the center axis of the hollow part 15 do not correspond to each other due to an assembly tolerance of the motor housing 14 and the bracket 8. For example, when the bearing 5 and the second bearing 6 are mounted with the rotor 4 interposed therebetween, the error in concentricity between the bearing 5 and the second bearing 6 may be large.

Although the center axis H1 of the bearing supporter housing part 81 and the center axis of the hollow part 15 do not correspond to each other, the bearing supporter 9 may adjust the position of the bearing 5 to be aligned with the position of the second bearing 6 such that the center axis B1 of the bearing 5 and the center axis of the second bearing 6 maximally correspond to each other.

The bearing supporter 9 may be disposed between the bracket 8 and the bearing 5, and may support bearing 5. The bearing supporter 9 may be press-fitted between the bracket 8 and the bearing 5.

In the motor M, the concentricities of the bearing 5 and the second bearing 6 may not correspond to each other due to the assembly tolerance of the motor housing 14 and the bracket 8. When the concentricities of the bearing 5 and the second bearing 6 may not correspond to each other as described above, the bearing supporter 9 may support the bearing 5 such that the center axis B1 of the bearing 5 and the center axis of the second bearing 6 maximally correspond to each other in a state in which a portion of the bearing supporter 9 is elastically compressed.

That is, the bearing 5, as shown in FIG. 5, may pressurize a portion of the bearing supporter 9 in a state in which the center axis B1 of the bearing 5 and the center axis H1 of the bearing supporter housing part 81 do not correspond to each other. In this case, the bearing supporter 9 may support the bearing 5 in the state in which the portion pressurized by the bearing 5 is compressed.

The bearing supporter 9 may include a metal wire mesh in which at least one metal wire 91 is irregularly tangled.

The height L1 of the bearing supporter 9 may be higher than the height L2 of the bearing 5. A portion of the bearing supporter 9 may be disposed between the outer rim 52 of the bearing 5 and the bearing supporter housing part 81 of the bracket 8. The internal diameter D4 of the bearing supporter 9 may be equal to or smaller than the external diameter D1 of the outer rim 52 of the bearing 5. In some implementations, the external diameter of the bearing supporter 9 may be equal to or smaller than the internal diameter D2 of the bearing supporter housing part 81 of the bracket 8. A portion of the bearing supporter 9 may be press-fitted between the outer rim 52 of the bearing 5 and the bearing supporter housing part 81 of the bracket 8. The portion of the bearing supporter 9 may be fixed by the outer rim 52 of the bearing 5 and the bearing supporter housing part 81 of the bracket 8 in the state in which it is press-fitted.

The bearing supporter 9 may include a first area 9A that faces the bearing 5 and a second area 9B that does not face the bearing 5.

The first area 9A of the bearing supporter 9 may face the outer rim 52 of the bearing 5 and the bearing supporter housing part 81. The second area 9B of the bearing supporter 9 may include an area that faces the O-ring 54. The second area 9B of the bearing supporter 9 may further include an area that does not face both of the outer surface of the bearing 5 and the O-ring 54.

The bearing supporter 9 may come in contact with the cover part 82. When the bearing supporter 9 comes in contact with the cover part 82, the bearing supporter 9 may be held by the cover part 82, and the mounting position of the bearing supporter 9 may be determined by the cover part 82.

In some implementations, the bearing supporter may be protected by the outer rim 52 of the bearing 5, the bearing supporter housing part 81, and the cover part 82.

Heat of the bearing 5 may be transferred to the metal wire 91, and the heat transferred to the metal wire 91 may be transferred to the bracket 8 through a bracket contact part 92 of the metal wire 91, which comes in contact with the bracket 8.

In some implementations, the heat transferred to the metal wire 91 may be dissipated in an air cooling manner through the second area 9B of the metal wire 91, which does not face the bearing 5.

That is, the heat of the bearing 5 may be transferred to the bracket 8 through the bearing supporter 9, and the heat transferred to the bracket 8 may be transferred to air in the motor M through the bearing supporter 9.

The plurality of pores H may be open in the radial and axial directions of the bearing supporter 9. The plurality of pores H may include at least one first pore that faces the outer rim 52 of the bearing and at least one second pore that does not face the outer rim 52 of the bearing 5.

The air guided by the diffuser 74 may be introduced into the bearing supporter 9 through the second pore, and then dissipate each of the bearing 5, the bearing supporter 9, and the bracket 8 while passing through the first pore.

The bearing supporter 9 may have an end part 95 opposite to the rotor 4. Air flowed in the gap S4 between the bearing support 9 and the rotor 4 in the air in the motor M may be introduced into the bearing supporter 9 through the end part 95 of the bearing supporter 9, which is opposite to the rotor 4.

Hereinafter, an example operation of the example motor will be described as follows.

First, when the motor M is driven, the rotating shaft 3 may be rotated, and the impeller 71 may be rotated together with the rotating shaft 3. When the impeller 71 is rotated, air outside the motor M may be suctioned into the impeller 71 through the air inlet 11.

The air suctioned into the impeller 71 may be flowed into the diffuser 74 by the impeller 71, and the air flowed into the diffuser 74 may pass through the gap S2 between the diffuser 74 and the impeller cover 13 while being guided by the diffuser 74. The air guided by the diffuser 74 may be sequentially guided by the diffuser vane 76 and the guide vane 77.

The air guided by the guide vane 77 may pass through the gap S3 between the diffuser 74 and the stator 2. Some of the air passing through the gap S3 between the diffuser 74 and the stator 2 may be introduced into the bearing supporter 9 by passing through the gap S4 between the bearing supporter 9 and the rotor 4, and some of the air passing through the gap S3 between the diffuser 74 and the stator 2 may be flowed into the gap S5 between the rotor 4 and the stator 2.

The air introduced into the bearing supporter 9 may be introduced into the bearing heat dissipation flow path S6 by passing through the plurality of pores H formed in the bearing supporter 9. The air introduced into the bearing supporter 9 may come in contact with each of the bearing 5, the bearing supporter 9, and the bracket 8 while passing through the plurality of pores H, and absorb heat of each of the bearing 5, the bearing supporter 9, and the bracket 8.

The air passing through the plurality of pores H formed in the bearing supporter 9 may be discharged to the outside of the bracket 8 by passing through the bracket through-hole 87, be introduced into the first gap S7 between the cover part 82 and the impeller 71 to pass through the first gap S7, and be then introduced into the second gap S8 between the diffuser 74 and the impeller 71 to pass through the second gap S8. The air passing through the second gap S8 may be flowed into the gap S2 between the diffuser 74 and the impeller cover 13 to be mixed with the air guide by the impeller 71, and the mixed air may be guided to the diffuser 74.

Figure 6:
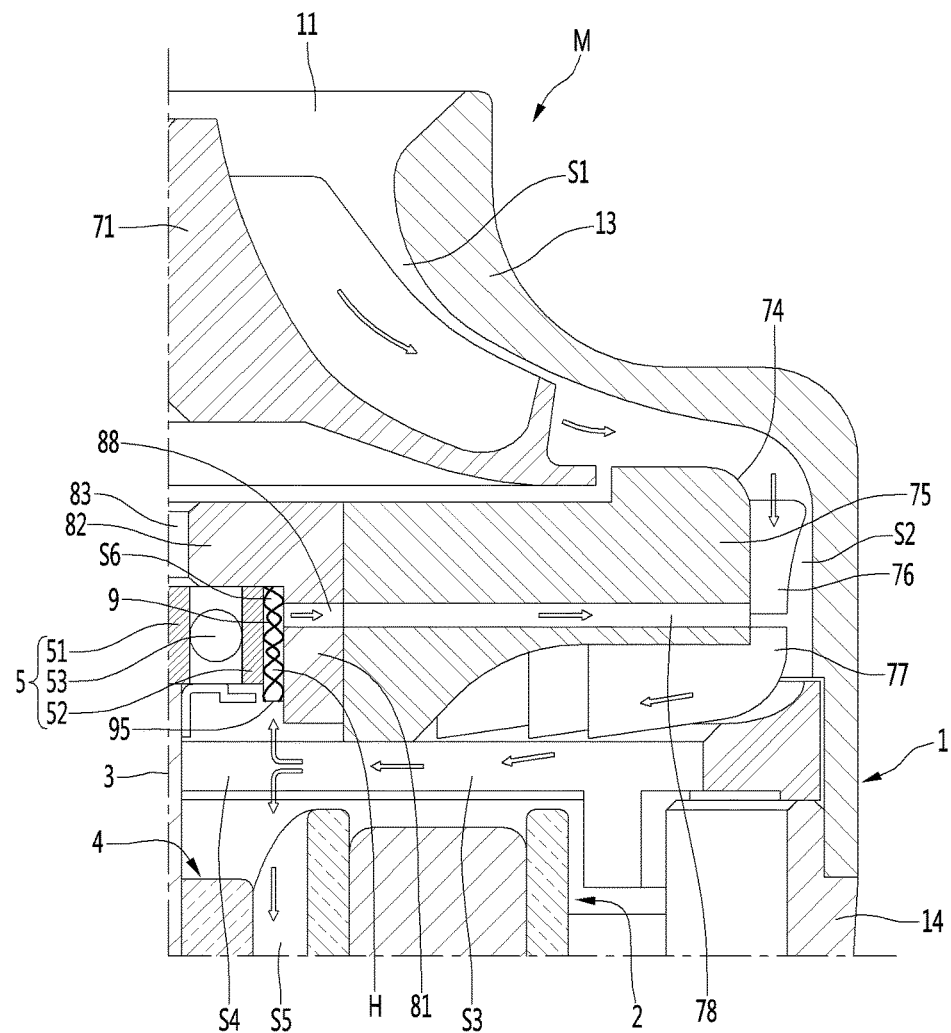
FIG. 6 is a view showing an example flow of air in an example motor dissipating heat of an example bearing.

FIG. 6 is a view showing an example flow of air when a motor dissipates heat of an example bearing.

An example bracket 8 may include a bearing supporter housing part 81 surrounding a bearing supporter 9, and a bracket through-hole 88 may be formed in the bearing supporter housing part 81. In some implementations, a diffuser through-hole 78 that allows a space between a diffuser 74 and an impeller cover 13 to communicate with the bracket through-hole 88 may be formed in the diffuser 74.

The bracket through-hole 88 of this implementation may be formed to be open in the radial direction of the bearing supporter housing part 81. In some implementations, the diffuser through-hole 78 may be formed to be open in the radial direction of the diffuser 74, for example, or a body part 75.

In this implementation, the other components except the bracket through-hole 88 and the diffuser through-hole 78 and their operations are identical or similar to those of the aforementioned implementation. Therefore, the components except the bracket through-hole 88 and the diffuser through-hole 78 are designated by like reference numerals, and their detailed descriptions will be omitted.

Air introduced into the bearing supporter 9 may absorb heat of each of a bearing 5, the bearing supporter 9, and a bracket 8 while passing through the plurality of pores H. The air may sequentially pass through the bracket through-hole 88 formed in the bearing supporter housing part 81 and the diffuser through-hole 78 formed in the diffuser 74 and be then flowed into a gap S2 between the diffuser 74 and the impeller cover 13.

The air flowed into the gap S2 between the diffuser 74 and the impeller cover 13 may be mixed with air guided by the impeller cover 13 and then guided to the diffuser 74.

Figure 7:
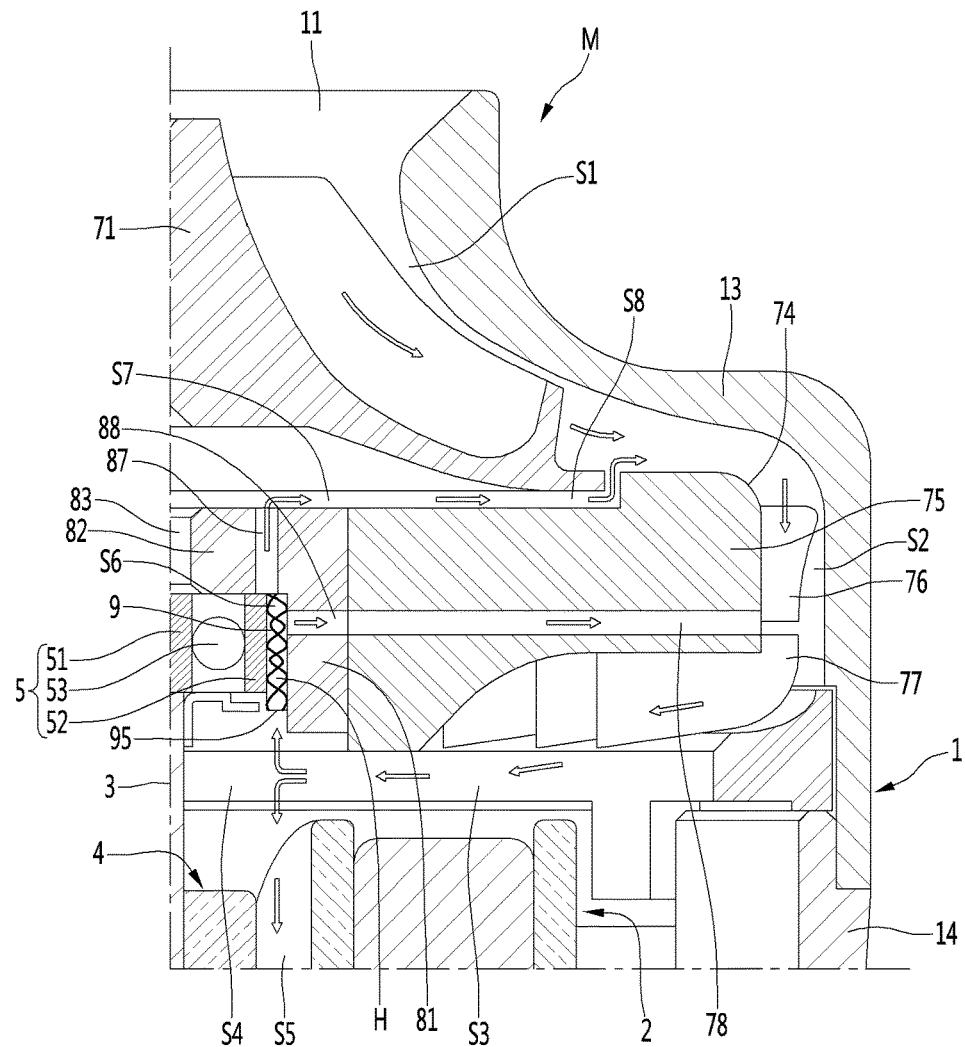
FIG. 7 is a view showing an example flow of air in another example motor dissipating heat of a bearing.

FIG. 7 is a view showing an example flow of air when another example motor dissipates heat of an example bearing.

An example bracket 8 may include a bearing supporter housing part 81 surrounding a bearing supporter 9, and a cover part 82 formed in the bearing supporter housing part 81 to cover between inner and outer rims 51 and 52 of a bearing 5.

In the bracket 8, at least one first bracket through-hole 87 that faces at least one portion of the bearing supporter 9 may be formed in the cover part 82, and at least one second bracket through-hole 88 may be formed in the bearing supporter housing part 81.

In some implementations, a diffuser through-hole 78 that allows a space between a diffuser 74 and an impeller cover 13 to communicate with the second bracket through-hole 88 may be formed in the diffuser 74.

The first bracket through-hole 87 and the second bracket through-hole 88 may be open in directions different from each other.

The first bracket through-hole 87 may be open in a direction parallel to a rotating shaft 3 in the cover part 82.

The second bracket through-hole 88 may be open in the radial direction of the diffuser 74 in the bearing supporter housing part 81. The second bracket through-hole 88 may be open in a direction perpendicular to the rotating shaft 3 in the bearing supporter housing part 81.

In this implementation, the motor may include a first heat dissipation flow path including a bearing heat dissipation flow path S6, the first bracket through-hole 87, a first gap S7, and a second gap S8, and a second heat dissipation flow path including the bearing heat dissipation flow path S6, the second bracket through-hole 88, and the diffuser through-hole 78.

The first heat dissipation flow path and the second heat dissipation flow path may be separated from each other at the bearing heat dissipation flow path S6. Air inside the motor M can more reliably pass through the bearing heat dissipation flow path S6, and the heat dissipation performance of the bearing 5 can be maximized.

Figure 8:
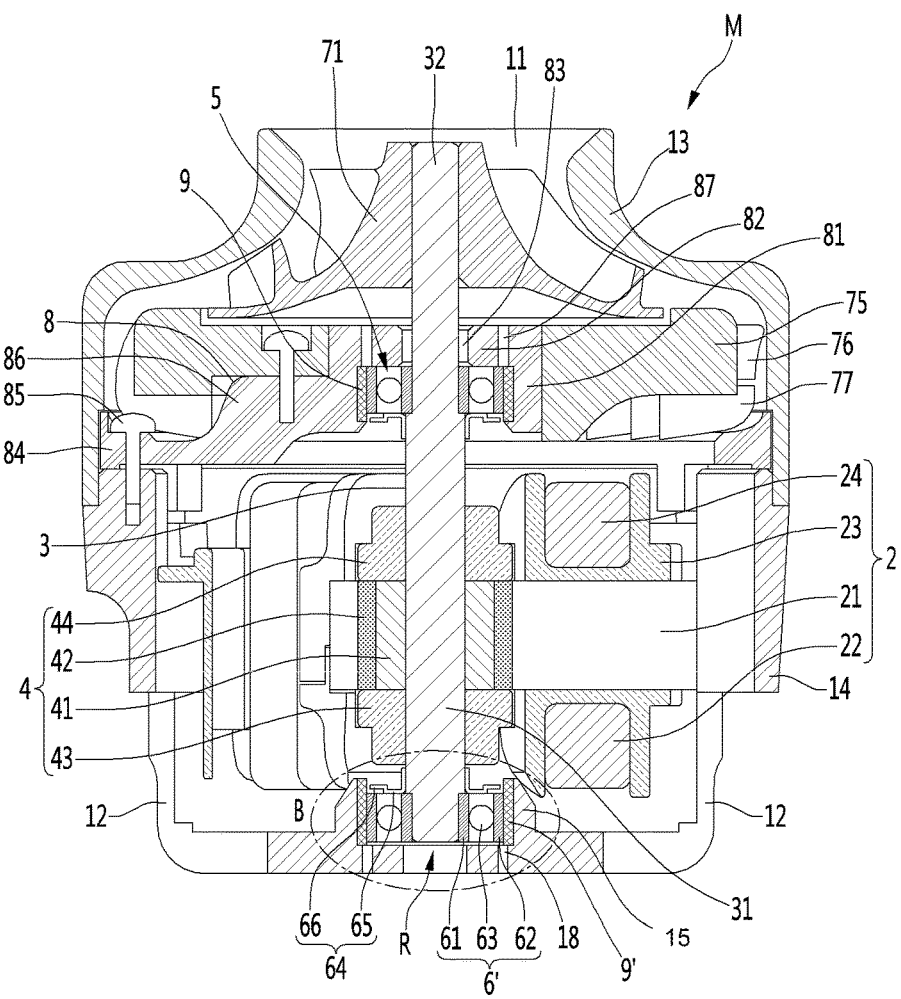
FIG. 8 is a sectional view showing another example motor.
Figure 9:
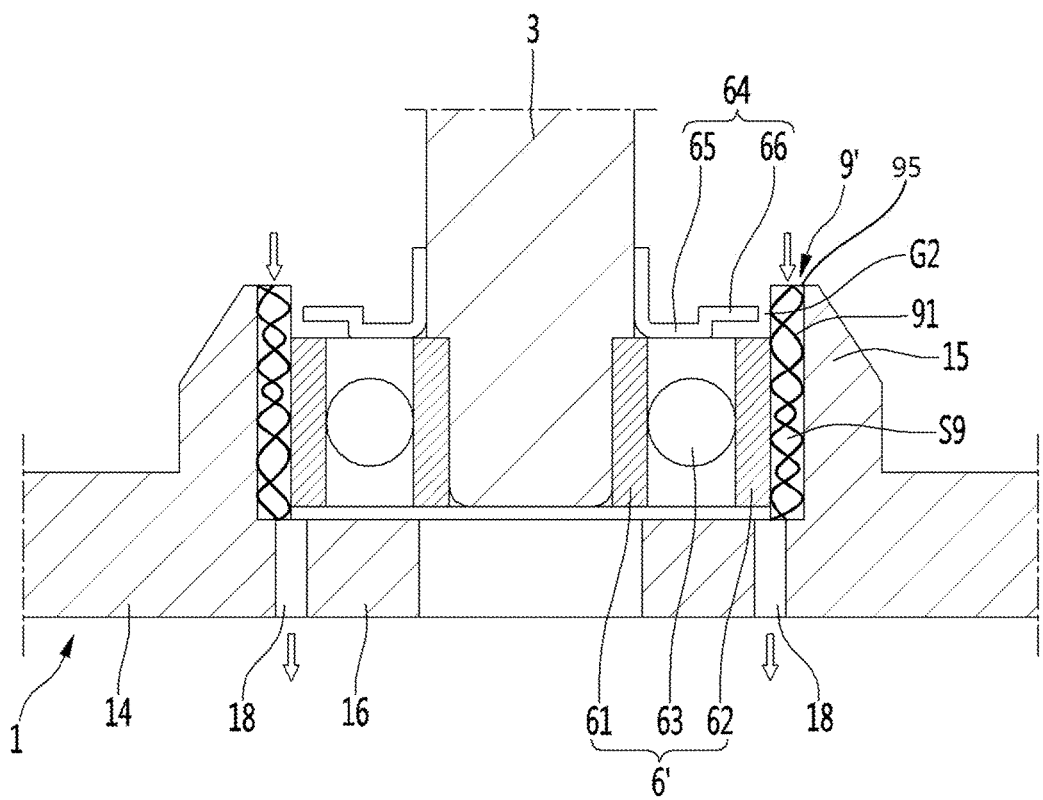
FIG. 9 is an enlarged sectional view of portion B of FIG. 8.
Figure 10:
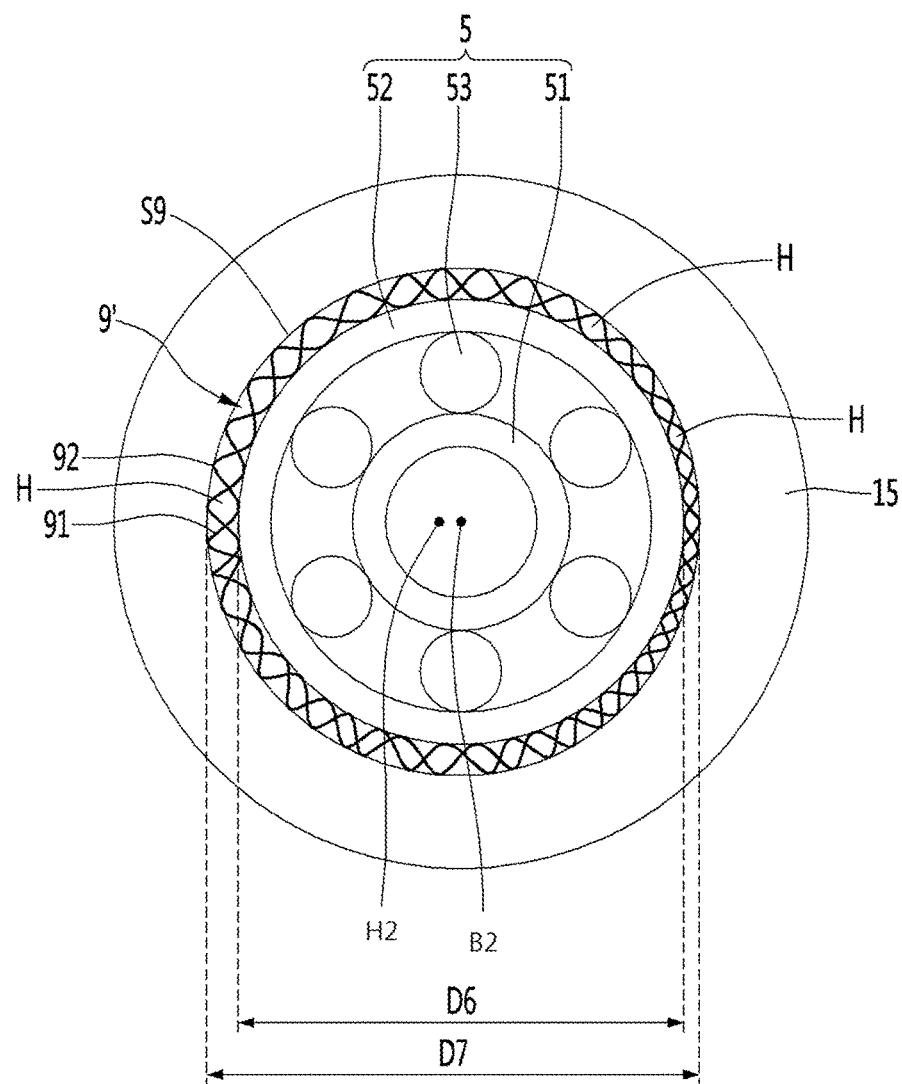
FIG. 10 is a view showing an example flow of air in the example motor dissipating heat of an example second bearing.

FIG. 8 is a sectional view showing an example motor. FIG. 9 is an enlarged sectional view of portion B of FIG. 8. FIG. 10 is a view showing an example flow of air when the motor dissipates heat of an example second bearing.

In this implementation, an example hollow part 15 larger than a rotating shaft 3 may be formed in a motor housing 14, and a second bearing 6' of which external diameter D6 is smaller than the internal diameter D7 of the hollow part 15 may be mounted to the rotating shaft 3. In some implementations, a second bearing heat dissipation flow path S9 through which air passes may be formed between the inner surface of the hollow part 15 and the outer surface of the second bearing 6', and a second bearing supporter 9' in which a plurality of pores H are formed may be disposed in the second bearing heat dissipation flow path S9.

In this implementation, the other components except the second bearing 6' and the second bearing supporter 9' and their operations are identical or similar to those of the aforementioned implementation. Therefore, the components except the second bearing 6' and the second bearing supporter 9' are designated by like reference numerals, and their detailed descriptions will be omitted.

Only the installation position of the second bearing supporter 9' is different from that of the bearing supporter 9 of the aforementioned implementation, and the detailed structure and function of the second bearing supporter 9' may be identical to those of the bearing supporter 9 of the aforementioned implementation. Therefore, its detailed description will be omitted.

In this implementation, the motor may include both of the bearing supporter 9 and the second bearing supporter 9', and the bearing supporter 9 and the second bearing supporter 9' may align the bearing 5 and the second bearing 6' at positions different from each other. The position of the bearing 5 aligned by the bearing supporter 9 is identical to that of the aforementioned implementation, and therefore, its detailed description will be omitted.

An example second O-ring 64 of this implementation may include an inner ring 65 mounted to the rotating shaft 3 and an outer ring 66 spaced apart from an outer rim 62 of the second bearing 6'. Also, the second O-ring 64 may be mounted to the rotating shaft 3 to be located inside the second bearing supporter 9'.

A gap G2 may be formed between the outer circumference of the second O-ring 64 and the second bearing supporter 9'.

The second O-ring 64 does not come in contact with the inner circumference of the second bearing supporter 9', and thus the abrasion of the second bearing supporter 9' and the second O-ring 64 can be minimized. In some implementations, the gap G2 can assist air passing through a gap S5 between a stator 2 and a rotor 4 to be introduced into the plurality of pores H formed in the second bearing supporter 9'.

The second bearing 6', as shown in FIG. 10, may pressurize a portion of the second bearing supporter 9' in a state in which the center axis B2 of the second bearing 6' does not correspond to the center axis H2 of the hollow part 15. In this case, the second bearing supporter 9' may support the second bearing 6' in the portion pressurized by the second bearing 6' is compressed.

For example, the center axis H2 of the hollow part 15 shown in FIG. 10 may not correspond to the center axis H1 of the bearing supporter housing part 81 shown in FIG. 5 due to an assembly tolerance of a motor housing 14 and a bracket 8. In this case, the position of the second bearing 6' can be aligned together with the rotating shaft 3 in the state in which the second bearing 6' is supported by the second bearing supporter 9', and the concentricities of the bearing 5 and the second bearing 6' can correspond to each other.

In some implementations, as at least one of the bearing supporter 9 and the second bearing supporter 9' is elastically deformed, the concentricities of the bearing 5 and the second bearing 6' can correspond to each other.

In some implementations, as each of the bearing supporter 9 and the second bearing supporter 9' is elastically deformed according to the assembly tolerance of the motor housing 14 and the bracket 8, the concentricities of the bearing 5 and the second bearing 6' can correspond to each other.

For example, the position of the bearing 5 can be aligned by the bearing supporter 9, and the position of the second bearing 6' can be aligned by the second bearing supporter 9'. In this case, the concentricities of the bearing 5 and the second bearing 6' can smoothly correspond to each other, as compared with the aforementioned implementation.

The second bearing supporter 9' may have a hollow cylindrical shape. The inner surface of the second bearing supporter 9' may come in contact with the outer surface of the second bearing 6', and the outer surface of the second bearing supporter 9' may come in contact with the inner surface of the hollow part 15.

The second bearing supporter 9' may have an end part 95 opposite to the rotor 4.

In some implementations, in the motor housing 14, at least one air outlet 18 may be formed in an area facing the second bearing supporter 9'. The air outlet 18 may be formed in a body part 16 of the motor housing 14. When the air outlet 18 is formed, the air passing through the gap S5 between the stator 2 and the rotor 4 can be more easily introduced into the second bearing heat dissipation flow path S9.

The air passing through the gap S5 between the stator 2 and the rotor 4 can efficiently dissipate heat of each other the second bearing 6', the second bearing supporter 9', and the motor housing 14 while passing through the plurality of pores H formed in the second bearing supporter 9'.

Although some implementations of the present disclosure are described for illustrative purposes, it will be apparent to those skilled in the art that various modifications and changes can be made thereto within the scope of the disclosure without departing from the essential features of the disclosure.

Accordingly, the aforementioned implementations should be construed not to limit the technical spirit of the present disclosure but to be provided for illustrative purposes so that those skilled in the art can fully understand the spirit of the present disclosure.

The scope of the present disclosure should not be limited to the aforementioned implementations but defined by appended claims. The technical spirit within the scope substantially identical with the scope of the present disclosure will be considered to fall in the scope of the present disclosure defined by the appended claims.

What is claimed is:

1. A motor comprising:
   a motor body;
   a bracket installed in the motor body;
   a rotating shaft;
   a bearing accommodated inside the bracket and supporting the rotating shaft; and
   a bearing supporter defining a plurality of pores,
   wherein the bracket and the bearing define a bearing heat dissipation flow path between an outer surface of the bearing and an inner surface of the bracket, the bearing heat dissipation flow path being configured to pass air therethrough,
   wherein the bearing supporter is disposed in the bearing heat dissipation flow path, and
   wherein the bracket defines:
      a rotating shaft through-hole through which the rotating shaft rotatably passes, and
      at least one bracket through-hole that is spaced apart from the rotating shaft through-hole, that faces one or more of the plurality of pores, and that is configured to discharge air that has passed through the plurality of pores of the bearing supporter.

2. The motor according to claim 1, wherein the bearing supporter comprises a metal wire mesh in which at least one metal wire has one or more curved portions.

3. The motor according to claim 1, wherein the bearing supporter has a hollow cylindrical shape, and
   wherein the bearing supporter has an inner surface that contacts the outer surface of the bearing, and an outer surface that contacts the inner surface of the bracket.

4. The motor according to claim 1, wherein the at least one bracket through-hole is defined at a position radially outward relative to the rotating shaft through-hole, and
   wherein the bearing is disposed radially between the rotating shaft through-hole and the at least one bracket through-hole.

5. A motor comprising:
   a motor housing;
   a rotating shaft assembly that includes a rotating shaft, a rotor, and a bearing, wherein the rotor and the bearing are mounted to the rotating shaft;
   a bearing supporter defining a plurality of pores;
   a stator installed in the motor housing, the stator surrounding the rotor;
   an impeller connected to the rotating shaft;
   an impeller cover that surrounds an outer circumference of the impeller, the impeller cover defining an air inlet between the impeller and the impeller cover;
   a diffuser disposed inside the impeller cover; and
   a bracket coupled to at least one of the motor housing, the impeller cover, or the diffuser,
   wherein the bearing and the bracket define a bearing heat dissipation flow path between an outer surface of the bearing and an inner surface of the bracket, the bearing heat dissipation flow path being configured to pass air,
   wherein the bearing supporter is disposed in the bearing heat dissipation flow path, and
   wherein the bracket defines:
      a rotating shaft through-hole through which the rotating shaft rotatably passes, and
      at least one bracket through-hole that is spaced apart from the rotating shaft through-hole, that faces one or more of the plurality of pores, and that is configured to discharge air that has passed through the plurality of pores of the bearing supporter.

6. The motor according to claim 5, wherein the bearing supporter has an end part facing toward the rotor.

7. The motor according to claim 5, wherein the diffuser includes a guide vane configured to guide air toward a gap between the bearing supporter and the rotor.

8. The motor according to claim 5, wherein the bearing comprises:
   an inner rim fixed to the rotating shaft;
   an outer rim spaced apart from the inner rim; and
   a rolling member disposed between the inner rim and the outer rim,
   wherein the bracket comprises:
   a bearing supporter housing part that surrounds an outer circumference of the bearing supporter, and
   a cover part that extends from the bearing supporter housing part and covers a portion of the bearing between the inner rim and the outer rim, the cover part being positioned opposite the impeller, and
   wherein the at least one bracket through-hole is defined in at least one of the bearing supporter housing part or the cover part.

9. The motor according to claim 8, wherein the cover part defines the at least one bracket through-hole at a position that faces the bearing supporter, and
   wherein the at least one bracket through-hole is open in an axial direction.

10. The motor according to claim 9, wherein the cover part and the impeller define a first gap configured to receive the air that has passed through the at least one bracket through-hole, and
    wherein the diffuser and the impeller define a second gap that is configured to discharge the air that has passed through the first gap.

11. The motor according to claim 10, wherein the at least one bracket through-hole is located between the first gap and the bearing supporter and faces each of the first gap and the bearing supporter.

12. The motor according to claim 5, wherein the bearing comprises:
    an inner rim fixed to the rotating shaft;
    an outer rim spaced apart from the inner rim; and
    a rolling member disposed between the inner rim and the outer rim,
    wherein the bracket comprises a bearing supporter housing part that surrounds the bearing supporter,
    wherein the bearing supporter housing part defines the at least one bracket through-hole, and
    wherein the diffuser defines a diffuser through-hole that extends to a space between the diffuser and the impeller cover, the diffuser through-hole being configured to communicate with the at least one bracket through-hole.

13. The motor according to claim 5, wherein the bearing supporter comprises a metal wire mesh in which at least one metal wire has one or more of curved portions.

14. The motor according to claim 5, wherein the bearing supporter has a hollow cylindrical shape, and
    wherein the bearing supporter has an inner surface that contacts the outer surface of the bearing, and an outer surface that contacts the inner surface of the bracket.

15. The motor according to claim 5, wherein the bearing comprises:
    an inner rim fixed to the rotating shaft;
    an outer rim spaced apart from the inner rim; and
    a rolling member disposed between the inner rim and the outer rim, wherein the bracket comprises a bearing supporter housing part that surrounds the bearing supporter, wherein the bearing supporter has an external diameter less than an internal diameter of the bearing supporter housing part, and wherein the bearing heat dissipation flow path has a hollow cylindrical shape and is defined between an outer circumference of the outer rim and an inner circumference of the bearing supporter housing part.

16. The motor according to claim 5, further comprising:
a second bearing mounted to the rotating shaft; and
a second bearing supporter defining a plurality of pores,
wherein the motor housing includes a hollow part that has an inner diameter greater than an outer diameter of the rotating shaft,
wherein the second bearing has an outer diameter less than the inner diameter of the hollow part and is located between the rotating shaft and the hollow part,
wherein the hollow part and the second bearing define a second bearing heat dissipation flow path between an inner surface of the hollow part and an outer surface of the second bearing, and
wherein the second bearing supporter is disposed in the second bearing heat dissipation flow path.

17. The motor according to claim 16, wherein the motor housing defines at least one air outlet that faces the second bearing supporter.

18. The motor according to claim 16, wherein the second bearing supporter has an end part facing toward the rotor.

19. A motor comprising:
a motor housing;
a rotating shaft assembly including a rotating shaft, a rotor, and a bearing, wherein the rotor and the bearing are mounted to the rotating shaft;
a stator installed in the motor housing, the stator surrounding the rotor;
an impeller connected to the rotating shaft;
an impeller cover surrounding an outer circumference of the impeller, the impeller cover defining an air inlet between the impeller and the impeller cover;
a diffuser disposed inside the impeller cover;
a bracket mounted to at least one of the impeller cover, the motor housing, or the diffuser; and
a bearing supporter disposed between the bracket and the bearing, the bearing supporter defining a plurality of pores,
wherein the bearing comprises:
an inner rim fixed to the rotating shaft,
an outer rim spaced apart from the inner rim, and
a rolling member disposed between the inner rim and the outer rim,
wherein the bracket comprises:
a bearing supporter housing part that surrounds the bearing supporter, and
a cover part that extends from the bearing supporter housing part and covers a portion of the bearing between the inner rim and the outer rim,
wherein the cover part defines:
a rotating shaft through-hole through which the rotating shaft rotatably passes, and
at least one first bracket through-hole that is spaced apart from the rotating shaft through-hole and that faces the plurality of pores,
wherein the bearing supporter housing part defines at least one second bracket through-hole that is spaced apart from the rotating shaft through-hole,
wherein the diffuser defines a diffuser through-hole that extends to a space between the diffuser and the impeller cover, the diffuser through-hole being configured to communicate with the at least one second bracket through-hole, and
wherein the first and second bracket through-holes extend toward different directions from each other.

20. The motor according to claim 19, wherein the bearing supporter has an inner surface that contacts an outer surface of the outer rim, and an outer surface that contacts an inner surface of the bearing supporter housing part.

* * * * *